United States Patent
Ito (10) Patent No.: US 6,876,386 B1
(45) Date of Patent: Apr. 5, 2005

(54) DIGITAL CAMERA WITH DOWNSAMPLING AND ZOOM PROCESSING AND METHOD OF CONTROLLING OPERATION OF SAME

(75) Inventor: Kenji Ito, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 711 days.

(21) Appl. No.: 09/628,004

(22) Filed: Jul. 28, 2000

(30) Foreign Application Priority Data

Jul. 30, 1999 (JP) ............................................ 11-216059

(51) Int. Cl.$^7$ .............................................. H04N 5/262
(52) U.S. Cl. .............................. 348/240.1; 348/390.1; 348/561; 348/581
(58) Field of Search ................................. 345/660–671; 348/208.6, 208.13, 208.16, 221.1, 230.1, 240.1, 390.1, 399.1, 405.1, 407.1, 561

(56) References Cited

U.S. PATENT DOCUMENTS

| 4,589,029 A | * | 5/1986 | Torimaru et al. ...... 348/333.12 |
|---|---|---|---|
| 4,791,308 A | * | 12/1988 | Nagashima ............ 348/240.99 |
| 5,034,804 A | * | 7/1991 | Sasaki et al. ............ 348/231.4 |
| 6,411,361 B1 | * | 6/2002 | Hidaka et al. ................ 355/40 |
| 6,542,201 B1 | * | 4/2003 | Song et al. .................. 348/561 |
| 6,593,963 B1 | * | 7/2003 | Safai ....................... 348/222.1 |
| 6,614,474 B1 | * | 9/2003 | Malkin et al. .............. 348/252 |

\* cited by examiner

*Primary Examiner*—Tuan Ho
*Assistant Examiner*—Gevell Selby
(74) *Attorney, Agent, or Firm*—Birch, Stewart, Kolasch, & Birch, LLP (57) ABSTRACT

A CCD is driven so as to output a video signal at a rate of one line out of four up to an enlargement ratio of 2×. If the enlargement ratio of 2× is surpassed, the CCD is controlled so as to output a video signal at a rate of one line out of two. Since resolution of the image represented by the video signal output from the CCD is raised, an image having a comparatively high resolution is obtained even when the image is enlarged by an electronic zoom function.

6 Claims, 6 Drawing Sheets

AT 1/4-DOWNSAMPLING DRIVE

Fig. 4

AT 1/2-DOWNSAMPLING DRIVE

DIGITAL CAMERA WITH DOWNSAMPLING AND ZOOM PROCESSING AND METHOD OF CONTROLLING OPERATION OF SAME

BACKGROUND OF THE INVENTION

1. Field of the Invention

This invention relates to a digital camera capable of electronic zoom processing, and to a method of controlling the operation of the camera.

2. Description of the Related Art

In a portable image pick-up apparatus such as a digital camera, a subject is imaged by a solid-state electronic image sensing device such as a CCD. An image having a high resolution is obtained by providing the solid-state electronic image sensing device with a large number of pixels.

Some digital cameras are provided with a display device, and shooting angle is decided while the image of the subject is displayed on the display device. The resolution of the display device provided on the digital camera is not high and is in general lower than that of the solid-state electronic image sensing device.

In order to image a subject at a fixed period of $1/60$ of a second using a solid-state electronic image sensing device and display the image of the subject, which is represented by a video signal obtained by such imaging, smoothly in the form of a movie on a display device provided on a digital camera, it is required that the number of lines in the vertical direction of the image represented by the video signal output from the solid-state electronic image sensing device approximate the number of lines of the display device. In order to achieve this, the device is driven in such a manner that signal charge, which has accumulated in the photoelectric transducers constituting the solid-state electronic image sensing device, will be read out at intervals of a plurality of lines, by way of example. This is referred to as "pixel downsampling".

Digital cameras capable of electronic zooming also have come into widespread use. By applying a zoom command, the image of a subject within a prescribed area is enlarged by interpolating pixels.

When pixels are downsampled in order to display a moving image on the display device, resolution declines. If such an image is subjected to electronic zoom processing, often the image undergoes a further decline in resolution.

SUMMARY OF THE INVENTION

Accordingly, an object of the present invention is to arrange it so that there is no decline in resolution even if electronic zoom processing is executed.

According to the present invention, the foregoing object is attained by providing a digital camera comprising: an imaging unit for imaging a subject at a fixed period by a solid-state electronic image sensing device and outputting a video signal, which represents the image of the subject obtained by imaging, upon downsampling the video signal at a given downsampling ratio; an electronic-zoom command unit for applying an electronic zoom command and a zoom magnification; a zoom unit (zoom means) for subjecting the video signal output from the imaging unit to electronic zoom processing in accordance with the zoom magnification, which has been applied from the electronic-zoom command unit, in such a manner that an image represented by the video signal output from the imaging unit will be enlarged; a display control unit (display control means) for performing control in such a manner that the image represented by the video signal output from the imaging unit will be displayed on the display device; and a downsampling-ratio control unit (downsampling-ratio control means) for reducing the downsampling ratio in response to application of the electronic zoom command from the electronic-zoom command unit.

The present invention provides also an operation control method suited to the camera described above. Specifically, the present invention provides a method of controlling a digital camera having an imaging unit for imaging a subject at a fixed period by a solid-state electronic image sensing device and outputting a video signal, which represents the image of the subject obtained by imaging, upon downsampling the video signal at a given downsampling ratio, the method comprising the steps of: applying an electronic zoom command and a zoom magnification; subjecting the video signal output from the imaging unit to electronic zoom processing in accordance with the applied zoom magnification in such a manner that an image represented by the video signal output from the imaging unit will be enlarged; displaying the image represented by the video signal, which has been subjected to the electronic zoom processing, on the display device; and reducing the downsampling ratio in response to application of the electronic zoom command.

In accordance with the present invention, a subject is imaged at fixed periods by the imaging unit. The latter is capable of outputting the image of the subject, which has been obtained by imaging, upon downsampling the image at a given downsampling ratio. The image of the subject is displayed on the display device by applying the video signal, which is output from the imaging unit, to the display device. Since the pixels constituting the image of the subject rather than the image capable of being read by the imaging unit are downsampled at a given downsampling ratio, a smooth moving image can be displayed on the display device. The downsampling may be performed by a downsampling circuit.

When the electronic zoom command is applied, electronic zoom processing is carried out in accordance with the electronic zoom command. The enlarged image of the subject is displayed by applying the electronic zoom processed video signal to the display unit.

When the electronic zoom command is applied, the downsampling ratio is reduced. Accordingly, the resolution of the image represented by the video signal output from the imaging unit rises in comparison with the resolution that prevailed prior to the reduction in the downsampling ratio. Thus an image having a high resolution can be obtained even when electronic zoom processing is applied.

By way of example, the downsampling ratio is reduced by making the number of lines of the image represented by a video signal that has undergone zoom processing greater than the number of lines of the image represented by the video signal output from the imaging unit.

When the video signal is output in sync with an applied synchronizing signal, it is advisable to reduce the downsampling ratio in sync with this synchronizing signal.

By reducing the downsampling ratio, it is possible to prevent disturbance of the image of the subject represented by the video signal output from the imaging unit.

The camera may be provided with a mode setting unit for setting an image-quality priority mode. In this case control is exercised in such a manner that the downsampling ratio is reduced when the image-quality priority mode has been selected by the mode selecting unit.

Thus, the user can set whether to give priority to image quality or to a display of a smoothly moving image.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described with reference to the drawings.

Figure 1:
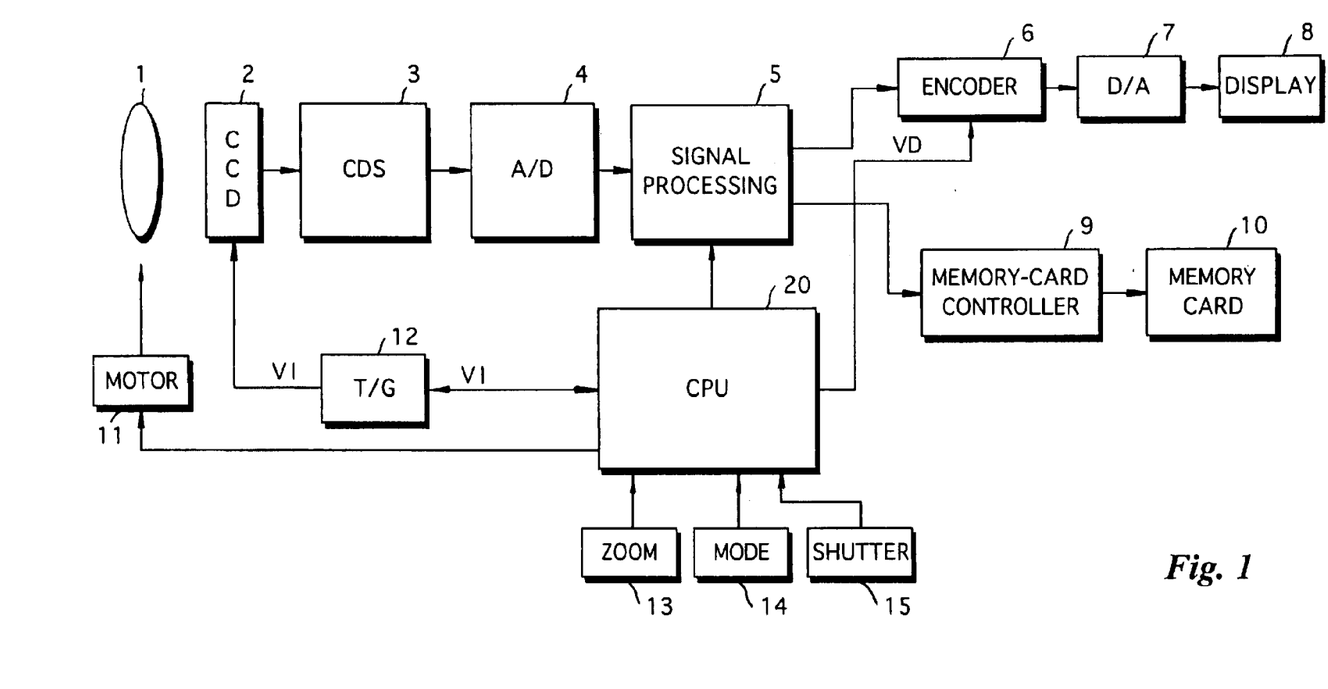
FIG. 1 is a block diagram illustrating the electrical construction of a digital still camera according to a preferred embodiment of the present invention.

FIG. 1 is a block diagram illustrating the electrical construction of a digital still camera according to a preferred embodiment of the present invention.

The digital still camera has its operation controlled by a CPU 20.

The digital still camera has an electronic zoom function. An output signal from a zoom switch 13, which is for applying an electronic zoom command and enlargement ratio (zoom magnification) and for designating a zoom area in which enlargement is to be performed, is input to the CPU 20.

The digital still camera can be set selectively to an image-quality priority mode and a motion priority mode by a mode switch 14. A signal indicating the mode setting is input from the mode switch 14 to the CPU 20. The image-quality priority mode is for raising image resolution by changing the driving scheme of a CCD 2, described later, when the electronic-zoom enlargement ratio exceeds a predetermined enlargement ratio. The motion priority mode gives priority to motion of an image (so as to smoothen the motion of the image), which is displayed on a display device 8, by fixing the driving scheme of the CCD 2.

The digital still camera is further provided with a shutter-release button 15. A signal indicating depression of the shutter-release button 15 also is input to the CPU 20.

A zoom motor 11 is controlled by the CPU 20. A zoom lens 1 is positioned by the zoom motor 11 in such a manner that the image of a subject is enlarged at an enlargement ratio supplied from the zoom switch 13. A light image representing the image of the subject is formed on the photoreceptor surface of the CCD 2 by the zoom lens 1.

The CCD 2 is controlled by an imaging synchronization signal VI and other control signals output from a timing generator (TG) 12. The CCD 2 images a subject at a fixed period (1/60 of a second) in sync with the imaging synchronization signal VI and outputs a video signal. The video signal output from the CCD 2 is input to an analog/digital conversion circuit 4 via a CDS (correlated double sampling circuit) 3. The analog/digital conversion circuit 4 converts the analog video signal to digital image data, which is input to a signal processing circuit 5.

The digital image data undergoes processing such as a gamma correction and a white balance adjustment in the signal processing circuit 5. The latter includes also a function for executing electronic zoom processing (pixel interpolation processing). Image data output from the signal processing circuit 5 enters an encoder 6, which subjects the image data to prescribed encoding processing. The encoder 6 is provided with a reproduction synchronization signal VD from the CPU 20 and outputs the image data in sync with the reproduction synchronization signal VD.

The digital image data is converted to an analog video signal by a digital/analog conversion circuit 7. The analog video signal resulting from the conversion is applied to the display device 8, whereby the image of the subject is displayed in the form of a movie at the fixed period.

If the shutter-release button 15 is pressed, the image data output from the signal processing circuit 5 is input to a memory-card controller 9. The latter records the image data on a memory card 10.

Figure 2:
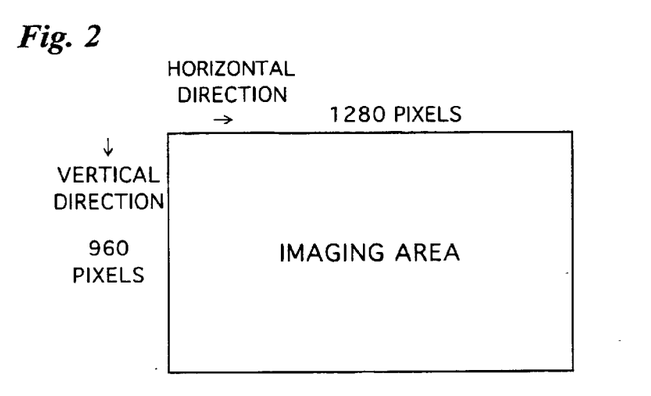
FIG. 2 illustrates the imaging area of a CCD.
Figure 3:
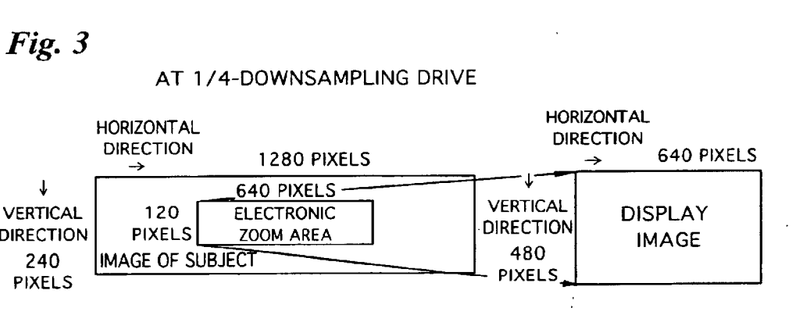
FIG. 3 illustrates the relationship among the image of subject obtained by ¼-downsampling drive, a zoom area and a display area.
Figure 4:
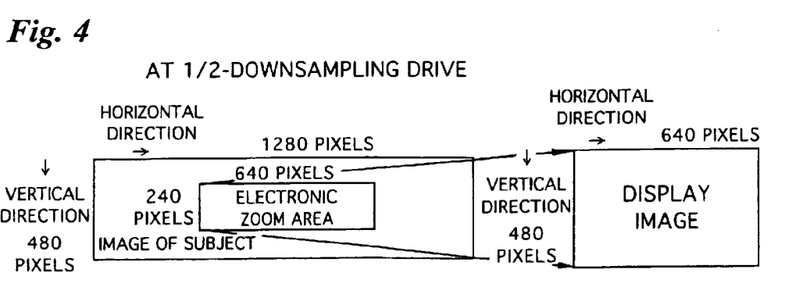
FIG. 4 illustrates the relationship among the image of subject obtained by ½-downsampling drive, a zoom area and a display area.
Figure 5A:
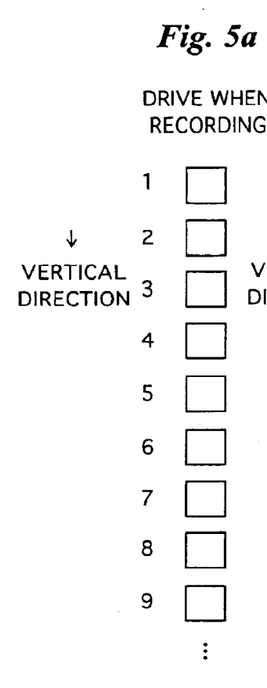
FIGS. 5a to 5c illustrate a plurality of schemes for driving a CCD and some of the pixels of an image represented by a video signal-obtained by these drive schemes.
Figures 5B, 5C:
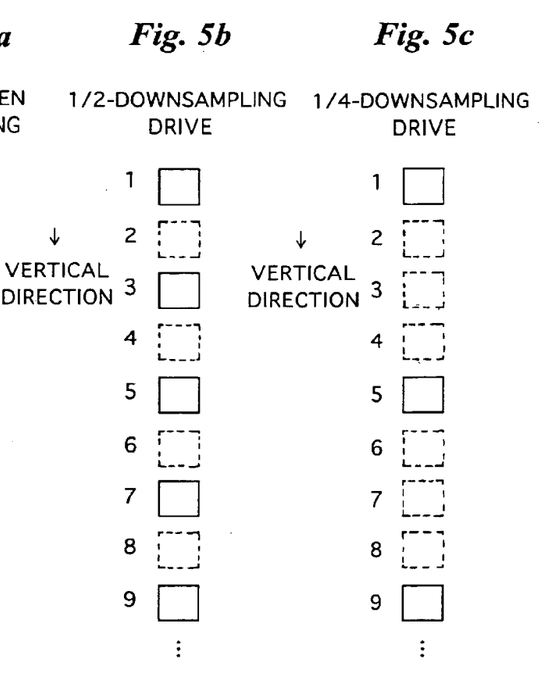

FIG. 2 shows the imaging area of the CCD 2, and FIGS. 3 and 4 show the image of a subject, which is represented by a video signal output from the CCD 2 when the CCD 2 is driven for downsampling, and the image of the subject (display image) displayed on the display device 8. FIGS. 5a to 5c show some pixels of the image represented by the video signal output from the CCD 2.

The CCD 2 has 1280 pixels horizontally and 960 pixels vertically. If the shutter-release button 15 is pressed, a video signal composed of 1280 pixels horizontally and 960 pixels vertically is output from the CCD 2 (see FIG. 5a) and converted to digital image data, which is recorded on the memory card 10.

The display device 8 is capable of displaying an image composed of 640 pixels horizontally and 480 pixels vertically.

When a movie image is displayed on the display device 8 in the manner described above, the CCD 2 is controlled by the timing generator 12 in such a manner that the number of pixels in the vertical direction will be reduced to one-fourth (this is referred to as "¼-downsampling drive"). Since the number of pixels vertically of the image represented by the video signal output from the CCD 2 becomes one-fourth the number of pixels of the imaging area of CCD 2, read-out can be performed at high speed. Thus the movie image is displayed on the display device 8 smoothly. The image represented by the video signal output from the CCD 2 thus has 1280 pixels horizontally and 240 pixels vertically (see FIGS. 3 and 5c, in which the dashed lines in FIG. 5c indicate the downsampled pixels).

A zoom area is designated by the zoom switch 13 in the image represented by these 1280 pixels in the horizontal direction and 240 pixels in the vertical direction. The signal processing circuit 5 executes electronic zoom processing in such a manner that the image in the designated zoom area is displayed in the area of the display screen of display device 8. For example, if an area composed of 640, pixels horizontally and 120 pixels vertically is designated as the zoom area, electronic zoom processing for interpolating four times the number of pixels in the vertical direction so as to display the image within this area in the area of the display screen of display device 8 is executed.

In the digital still camera according to this embodiment, the CCD 2 can be driven in such a manner that the number of pixels vertically of the image represented by the video signal output from the CCD 2 becomes one-half the number of pixels vertically of the imaging area of the CCD 2 (this is referred to as "½-downsampling drive). FIG. 4 illustrates the image of the subject represented by the video signal output from the CCD 2 in accordance with ½-downsampling drive. An image having 960 pixels in the vertical direction becomes an image having 240 pixels in the vertical direction in accordance with ½-downsampling drive if an electronic zoom area identical with the electronic zoom area shown in FIG. 3 is designated (see FIG. 5*b*).

Figure 6:
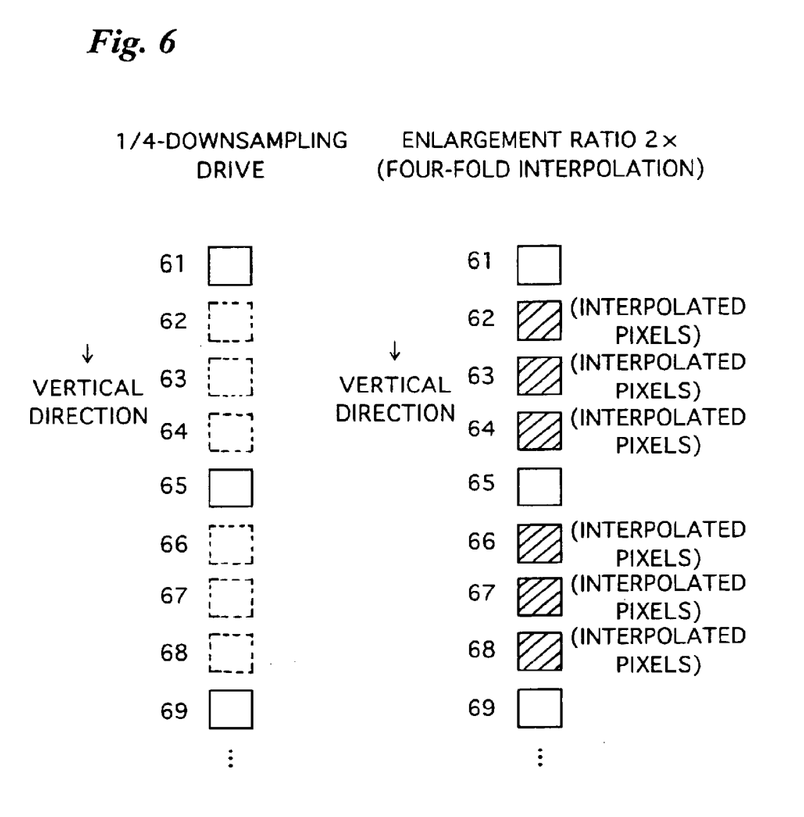
FIG. 6 illustrates the relationship between ¼-downsampling drive and interpolated pixels.

FIG. 6 illustrates some of the pixels of an image represented by a video signal obtained by ¼-downsampling drive and pixels in a case where an enlargement ratio of 2×has been applied.

When ¼-downsampling drive is performed, the CCD 2 outputs the video signal at a rate of one pixel per four pixels of the pixels constituting the imaging area of the CCD 2 in the vertical direction thereof. More specifically, the CCD 2 outputs a video signal in which the pixels have been downsampled at a rate of three pixels out of four. In FIG. 6, the pixels that have been downsampled are represented by the dashed lines and pixels that have not been downsampled are represented by the solid lines.

The enlargement ratio 2×causes an area which is half the imaging area of the CCD 2 in the vertical direction to be displayed in the display area of the display device 8. When ¼-downsampling drive is performed, the number of pixels vertically of the video signal output from the CCD 2 is 240. Half this number of pixels is 120. This video signal having 120 pixels in the vertical direction is interpolated to a video signal having 480 pixels in the vertical direction. In ¼-downsampling drive, therefore, the enlargement ratio 2×multiplies one pixel by a factor of four in the vertical direction (this is four-fold interpolation). In FIG. 6, the hatched pixels indicate pixels that have been interpolated.

Figure 7:
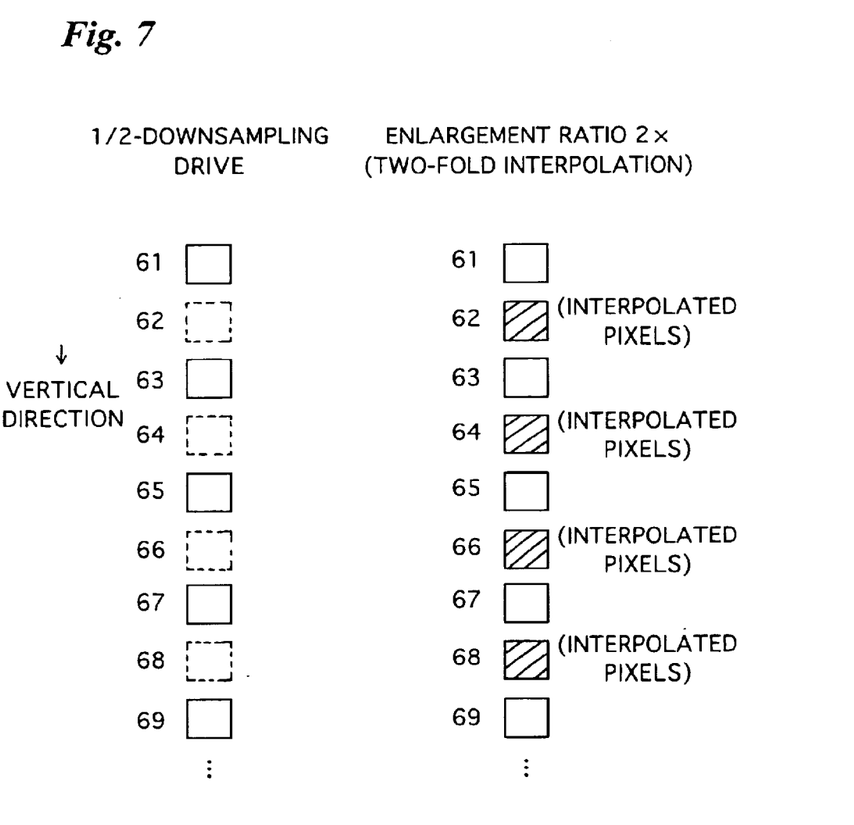
FIG. 7 illustrates the relationship between ½-downsampling drive and interpolated pixels.

FIG. 7 illustrates some of the pixels of an image represented by a video signal obtained by ½-downsampling drive and pixels in a case where an enlargement ratio of 2×has been applied.

When ½-downsampling drive is performed, the CCD 2 outputs the video signal at a rate of one pixel per two pixels of the pixels constituting the imaging area of the CCD 2 in the vertical direction thereof. More specifically, the CCD 2 outputs a video signal in which the pixels have been downsampled at a rate of one pixel out of two. In FIG. 7, the pixels that have been downsampled are represented by the dashed lines and pixels that have not been downsampled are represented by the solid lines in a manner similar to that of FIG. 6.

When ½-downsampling drive is performed, the number of pixels vertically of the video signal output from the CCD 2 is 480. Half this number of pixels is 240. Interpolating this video signal having 240 pixels vertically to a video signal having 480 pixels vertically is equivalent to doubling the enlargement ratio. In ½-downsampling drive, the enlargement ratio 2×multiplies one pixel by a factor of two in the vertical direction (this is two-fold interpolation).

In ½-downsampling drive, two-fold interpolation is performed when the enlargement ratio is set to 2×by the zoom switch 13. In FIG. 7, the hatched pixels indicate pixels that have been interpolated.

Thus, even with the same enlargement ratio of 2×, the resolution of an image obtained based upon a video signal acquired by ½-downsampling drive is higher than the resolution of an image obtained based upon a video signal acquired by ¼-downsampling drive. The digital still camera according to this embodiment controls the CCD 2 by ¼-downsampling drive up to an enlargement ratio of 2× and by ½-downsampling drive when the enlargement ratio surpasses 2×. As a result, a movie image having a comparatively high resolution is displayed on the display device 8.

Figure 8:
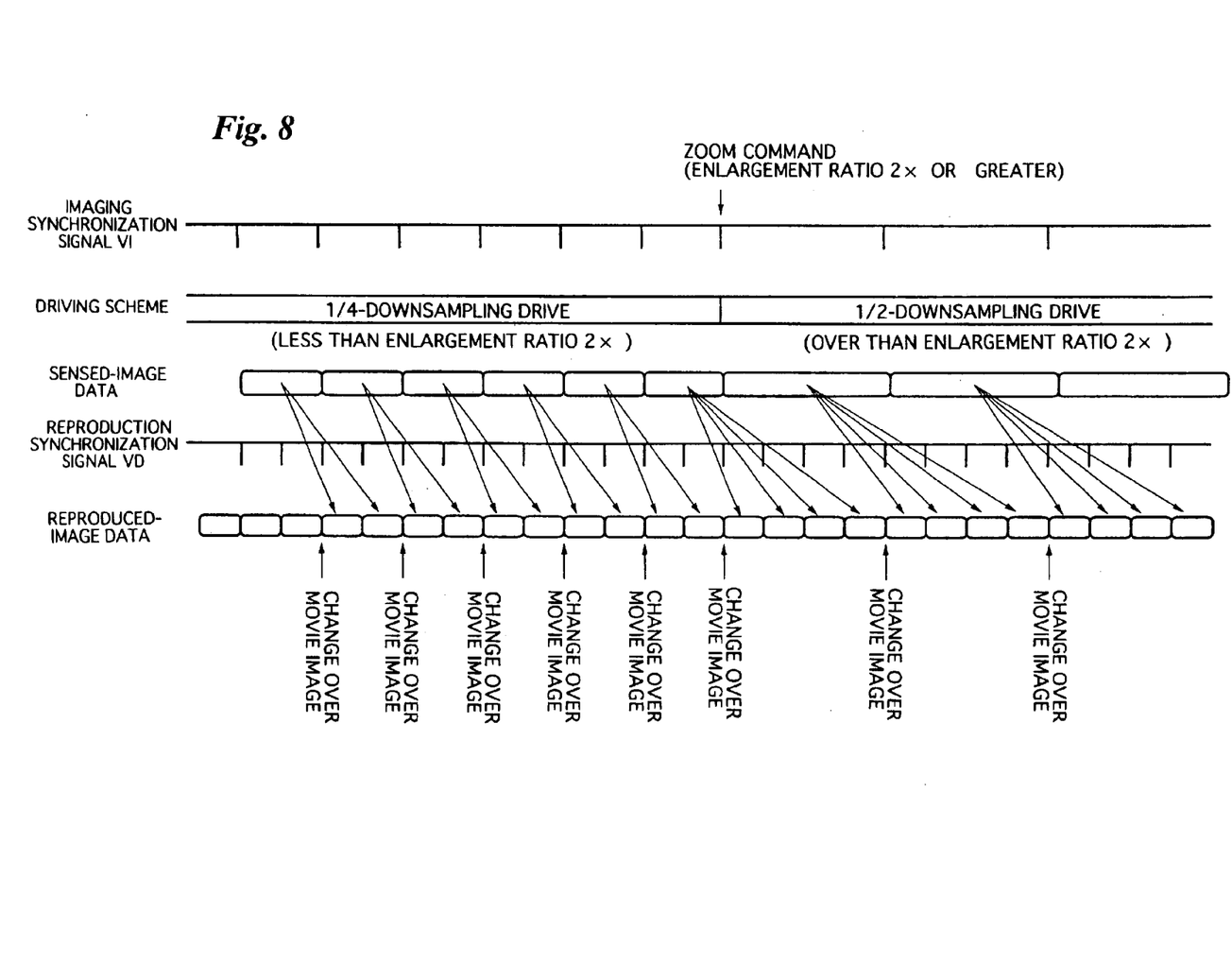
FIG. 8 is a time chart illustrating the operation of the digital still camera.

FIG. 8 is a time chart when prevails when a subject is imaged by the digital still camera. This time chart is for a case where the image-quality priority mode has been set by the mode switch 14. It goes without saying that when the motion priority mode has been set by the mode switch 14, the switching between ¼-downsampling drive and ½-downsampling drive is not carried out, as will be described next.

When the enlargement ratio that has been set by the zoom switch 13 is less than 2×, the CCD 2 is controlled by the timing generator 12 in such a manner that ¼-downsampling drive is established. The CCD 2 outputs the video signal in sync with the imaging synchronization signal VI. The video signal is converted to digital image data that is then input to the encoder 6 via the signal processing circuit 5 in the manner described earlier.

The encoder 6 outputs the reproduced image data in sync with the reproduction synchronization signal VD (=1/60 of a second). The reproduced image data is converted to an analog video signal in the digital/analog conversion circuit 7, which inputs this signal to the display device 8.

Thus the video signal from the CCD 2 is output at a rate of once per two VD signal pulses and the movie image is changed over at a rate of once per two VD signal pulses.

If the enlargement ratio is made 2×by the zoom switch 13 at time t, the CCD 2 is controlled by the timing generator 12 in such a manner that ½-downsampling drive is established. The CCD 2 outputs the video signal in sync with the imaging synchronization signal VI in a manner similar to that when ¼-downsampling drive is applied. The video signal is converted to digital image data that is input to the encoder 6 via the signal processing circuit 5.

The reproduced image data is output from the encoder 6 is sync with the reproduction synchronization signal VD and is converted to an analog video signal. The latter is applied to the display device 8.

Thus the video signal from the CCD 2 is output at a rate of once per four VD signal pulses and the movie image is changed over at a rate of once per four VD signal pulses.

Thus, even when an image is displayed by an electronic zoom function, a movie image having a comparatively high resolution can be obtained.

In the embodiment described above, changeover between ½-downsampling drive and ¼-downsampling drive is performed in response to the enlargement ratio becoming 2×. However, it goes without saying that drive may be changed over by designating a different enlargement ratio.

As many apparently widely different embodiments of the present invention can be made without departing from the spirit and scope thereof, it is to be understood that the invention is not limited to the specific embodiments thereof except as defined in the appended claims.

What is claimed is:

1. A digital still camera comprising:

an imaging device for imaging a subject and outputting a video signal, which represents an original image of a subject having a number of horizontal lines rather than a number of horizontal lines of display image which can be displayed on the display screen of the display device;

a downsampling device for downsampling the video signal outputted from said imaging device using a first downsampling-ratio wherein a number of lines of the original image represented by the video signal outputted from said imaging device is smaller than a number of lines of the display image;

a display controller for displaying the image represented by a video signal, which is downsampled by said downsampling device, on the display screen of the display device;

a zoom area designating device for designating a zoom area from the image displayed on the display screen; and an electronic zoom device for processing an electronic zoom wherein the image included in the zoom area designated by said zoom area designating device is displayed entirely on the display screen of the display device, using a zoom ratio, comprising:

a controller for controlling said downsampling device so as to carry out the downsampling processing using a second downsampling-ratio, which ratio of downsampling is smaller than the first downsampling ratio, when the zoom ratio at said electronic zoom device is higher than a zoom ratio which enlarges the original image to the image after downsampling using the first downsampling ratio.

2. The camera according to claim 1, wherein said imaging unit outputs a video signal in sync with a synchronization signal applied thereto; and said downsampling-ratio control unit reduces the downsampling ratio in sync with the synchronization signal.

3. The camera according to claim 1, wherein the camera is provided with a mode setting unit for setting an image-quality priority mode;

said controller reducing the downsampling ratio when the image-quality priority mode has been set by said mode setting unit.

4. A method for imaging a subject and outputting a video signal, which represents an original image of a subject having a number of horizontal lines rather than a number of horizontal lines of display image which can be displayed on the display screen of the display device;

downsampling the video signal using a first downsampling-ratio wherein a number of lines of the original image represented by the video signal is smaller than a number of lines of the display image;

the image represented by a video signal, which is downsampled;

designating a zoom area from the image displayed on the display screen;

processing an electronic zoom in order than the image included in the designated zoom area is displayed entirely using a zoom ratio; and downsampling the video signal using a second downsampling-ratio, which ratio of downsampling is smaller than the first downsampling ratio, when the zoom ratio at said electronic zoom device is higher than a zoom ratio which enlarges the original image to the image after downsampling using the first downsampling ratio.

5. The method according to claim 4, further comprising outputting a video signal in sync with a synchronization signal applied thereto; and reducing the downsampling ratio in sync with the synchronization signal.

6. The method according to claim 4, further comprising setting an image-quality priority mode; and reducing the downsampling ratio when the image-quality priority mode has been set.

* * * * *